US009853761B2

(12) United States Patent
Cavaliere et al.

(10) Patent No.: US 9,853,761 B2
(45) Date of Patent: Dec. 26, 2017

(54) PASSIVE OPTICAL NETWORK ARRANGEMENT AND METHOD

(75) Inventors: Fabio Cavaliere, Vecchiano (IT); Luca Giorgi, Ponsacco (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 42 days.

(21) Appl. No.: 13/995,655

(22) PCT Filed: Apr. 18, 2011

(86) PCT No.: PCT/EP2011/056075
§ 371 (c)(1),
(2), (4) Date: Jun. 19, 2013

(87) PCT Pub. No.: WO2012/084274
PCT Pub. Date: Jun. 28, 2012

(65) Prior Publication Data
US 2013/0287396 A1    Oct. 31, 2013

(30) Foreign Application Priority Data
Dec. 20, 2010   (EP) .................................... 10195870

(51) Int. Cl.
*H04J 14/00*    (2006.01)
*H04J 14/02*    (2006.01)

(52) U.S. Cl.
CPC .......... *H04J 14/02* (2013.01); *H04J 14/0227* (2013.01); *H04J 14/0238* (2013.01);
(Continued)

(58) Field of Classification Search
None
See application file for complete search history.

(56) References Cited

U.S. PATENT DOCUMENTS 7,167,648 B2 *  1/2007  Heinz ................ H04Q 11/0066
                                          370/404
7,500,261 B1 *  3/2009  Myers ..................... H04H 20/33
                                          370/311
(Continued)

FOREIGN PATENT DOCUMENTS

CN    101009530 A    8/2007
GB      2329291 A    3/1999

OTHER PUBLICATIONS

Kim et al; Traffic Share-Based Multicast Scheduling for Broadcast Video Delivery in Shared-WDM-PONs, 2007, IEEE and pp. 2814-2827.*

(Continued)

*Primary Examiner* — Ken N Vanderpuye
*Assistant Examiner* — Amritbir Sandhu
(74) *Attorney, Agent, or Firm* — Rothwell, Figg, Ernst & Manbeck, p.c.

(57) ABSTRACT

This disclosure relates to wavelength division multiplexed (WDM) passive optical networks (PON), and the transmission of point-to-point and broadcast or multicast channels from an optical line transmitter (OLT) to an optical network unit (ONU). There is provided a WDM PON (100) comprising: an OLT (105) coupled to a plurality of ONU (110a, 110b) using an optical fiber network (160); the OLT (105) having one or more WDM transceivers (115a, 115b) each arranged to receive multi-cast and point-to-point channels and wherein the or each WDM transceiver (115a, 115b) is arranged to transmit a said channel to a respective said ONU (110a, 110b) using a respective dedicated wavelength (λa, λb); an input channel switch (130a, 130b) associated with the or each WDM transceiver (115a, 115b) and arranged to selectively couple the input of the WDM transceiver to the multi-cast channels and the point-to-point channels (140, (Continued)

135); wherein the selected multi-cast or point-to-point channels are directly converted to the respective dedicated wavelength.

19 Claims, 2 Drawing Sheets

(52) U.S. Cl.
CPC ...... *H04J 14/0246* (2013.01); *H04J 14/0282* (2013.01); *H04J 14/0256* (2013.01); *H04J 14/0267* (2013.01)

(56) References Cited

U.S. PATENT DOCUMENTS

| | | | | |
|---|---|---|---|---|
| 2002/0176404 | A1* | 11/2002 | Girard | H04M 3/42153 370/352 |
| 2002/0184314 | A1* | 12/2002 | Riise | H04L 12/1859 709/205 |
| 2004/0184806 | A1* | 9/2004 | Lee | H04H 20/42 398/79 |
| 2005/0094460 | A1* | 5/2005 | Cho | G11C 8/08 365/222 |
| 2005/0094660 | A1* | 5/2005 | Lee | H04Q 11/0067 370/437 |
| 2006/0127091 | A1* | 6/2006 | Yoo | H04J 14/0226 398/69 |
| 2007/0025352 | A1* | 2/2007 | Tanaka | H04L 12/2854 370/390 |
| 2007/0211763 | A1* | 9/2007 | Solomon | H04L 12/18 370/498 |
| 2007/0280223 | A1* | 12/2007 | Pan | H04L 12/6418 370/360 |
| 2008/0271096 | A1* | 10/2008 | Gazier | H04N 7/17318 725/100 |
| 2008/0304830 | A1* | 12/2008 | Huang | H04J 14/0226 398/79 |
| 2009/0154355 | A1* | 6/2009 | Diab | H04L 47/10 370/236 |
| 2009/0164627 | A1* | 6/2009 | Tateno | H04L 12/24 709/224 |
| 2009/0202246 | A1* | 8/2009 | Kashima | H04H 20/69 398/77 |
| 2010/0020690 | A1* | 1/2010 | Komiya | H04L 12/1881 370/235 |
| 2011/0142080 | A1* | 6/2011 | Diab | H04J 3/0667 370/503 |
| 2011/0185052 | A1* | 7/2011 | Nakahira | H04L 41/083 709/223 |
| 2011/0314386 | A1* | 12/2011 | Jeong | G06F 3/0487 715/741 |
| 2012/0201542 | A1* | 8/2012 | Dahlfort | H04J 14/0282 398/70 |
| 2013/0039568 | A1* | 2/2013 | Futawatari | H04N 13/0007 382/154 |
| 2014/0129722 | A1* | 5/2014 | Casey | H04L 12/6418 709/227 |
| 2015/0357791 | A1* | 12/2015 | Zheng | H01S 5/1215 398/69 |

OTHER PUBLICATIONS

Kim et al; Traffic Share-Based Multicast Scheduling for Broadcast Video Delivery in Shared-WDM-PONs, Sep. 2007, Journal of Lightwave Technology, vol. 25, No. 9, pp. 2814-2827.*
Kim, N., et al., "Traffic Share-Based Multicast Scheduling for Broadcast Video Delivery in Shared-WDM-PONs", Journal of Lightwave Technology, IEEE Service Center, New York, NY, US, vol. 25, No. 9, Sep. 1, 2007, pp. 2814-2827, XP011191578.
First Office Action dated Mar. 25, 2015, issued in Chinese Patent Application No. 20118006156.1, 23 pages.

* cited by examiner

PASSIVE OPTICAL NETWORK ARRANGEMENT AND METHOD

CROSS-REFERENCE TO RELATED APPLICATIONS

This application is a 35 U.S.C. §371 National Phase Entry Application from PCT/EP2011/056075, filed Apr. 18, 2011, and designating the United States, which claims priority to European Application No. 10195870.0, filed Dec. 20, 2010. The above-mentioned applications are incorporated by reference herein.

TECHNICAL FIELD

This disclosure relates to wavelength division multiplexed (WDM) passive optical networks (PON), and the transmission of point-to-point and broadcast or multicast channels from an optical line transmitter (OLT) to an optical network unit (ONU).

BACKGROUND

WDM PON uses different wavelengths for each ONU which increases bandwidth per user or ONU when compared with other PON technologies using shared wavelengths such as GPON. Other WDM PON advantages include broadband user connections, symmetric downstream/upstream traffic, service transparency, possibility of stepwise system upgrade, long distance, channels segregation, and low latency. Because a dedicated wavelength is used for each ONU the data processing requirements are simplified at the OLT or central office and the ONU. This is because the individual users do not need to be individually addressed as they would in a shared wavelength PON, because the dedicated wavelength is only intended for one ONU. The need for addressing requires layer 2 and layer 3 processing equipment at the OLT and ONU which increases their complexity and cost. Thus for example traffic for a particular ONU must be packaged to be carried in a dedicated timeslot of the shared channel, or addressed using Ethernet packets for example. By comparison, in a WDM PON the traffic can be processed in the OLT at layer 1 and the incoming traffic directly converted to optical signals for transmission to the ONU, rather than requiring packing into addressed packets for example. This layer 1 processing considerably simplifies the central office equipment and reduces cost.

Whilst point-to-point traffic has been predominant in PON traffic to date, increasingly PON is also carrying multi-cast and broadcast traffic. Point-to-point traffic occurs when a user or ONU communicates with one other terminal point, for example a website or video-on-demand (VOD) server. Increasingly multicast/broadcast traffic such as television channels are being provided in which traffic from one source is transmitted to a number of end users such as ONU. In this situation the traffic is in one direction only (downstream) and is provided (logically) in parallel to each end user. In practice this can be achieved in PON using layer 2 processing in which the broadcast channels are packaged into Ethernet frames or into a dedicated downstream timeslot which all ONU can access.

Multicast or broadcast services in a WDM PON can be carried at Layer2 or Layer3, by allocating a portion the downstream frames sent to the final users. Alternatively these multicast services can be packaged into Layer2 packets and added to each or the respective ONU wavelength. However, this prevents the aforementioned advantages of only using Layer1 processing at the OLT from being utilized. Layer1 processing could be maintained by utilizing tunable filters at the ONU to receive broadcast or point-to-point channels on different wavelengths as required. However the use of tunable filters at ONU is expensive and the need for power splitting of the common broadcast channels reduces their power and hence robustness and range or distance. In a further alternative parallel fibers could be employed but this is very expensive.

SUMMARY

This disclosure provides a WDM PON comprising an OLT coupled to a plurality of ONU using an optical fibre network. The OLT has one or more WDM transceivers each arranged to receive multi-cast and point-to-point channels and each arranged to transmit the received channel to a respective ONU using a respective dedicated wavelength. An input channel switch associated with each WDM transceiver is arranged to selectively couple the input of the WDM transceiver to the multi-cast channels and the point-to-point channels. The selected multi-cast or point-to-point channels are directly converted to the respective dedicated wavelength. The input channel switch may be arranged to select between the multi-cast or the point-to-point channels in response to a control signal from the ONU corresponding to the WDM transceiver.

This arrangement allows Layer1 processing of both point-to-point and multicast/broadcast channels at the OLT and ONU. By using a switch to selectively couple the point-to-point and multicast channels to a WDM transceiver, and directly converting the selected channel to the respective wavelength, the selected channel is carried by a dedicated optical signal (wavelength) to the ONU. No re-packaging of the selected input channel (point-to-point or multicast) into Layer2 or Layer3 packets is required. Therefore the benefits of Layer1 processing at the OLT and ONU can be maintained, even when both point-to-point and multicast input channels are provided.

In an embodiment the input channel switch can be an electrical switch which couples the selected point-to-point or multicast channel to a WDM transceiver which directly converts this channel onto the dedicated wavelength using a tuned laser for example. Alternatively the point-to-point and multicast channels may be directly converted to optical wavelength signals before coupling to an optical input channel switch.

In other embodiments, there is also provided a method of operating a WDM PON, an OLT, and ONU and methods of operating these.

BRIEF DESCRIPTION OF THE DRAWINGS

Embodiments will now be described with reference to the following drawings, by way of example only and without intending to be limiting, in which.

DETAILED DESCRIPTION OF THE EMBODIMENTS

Figure 1:
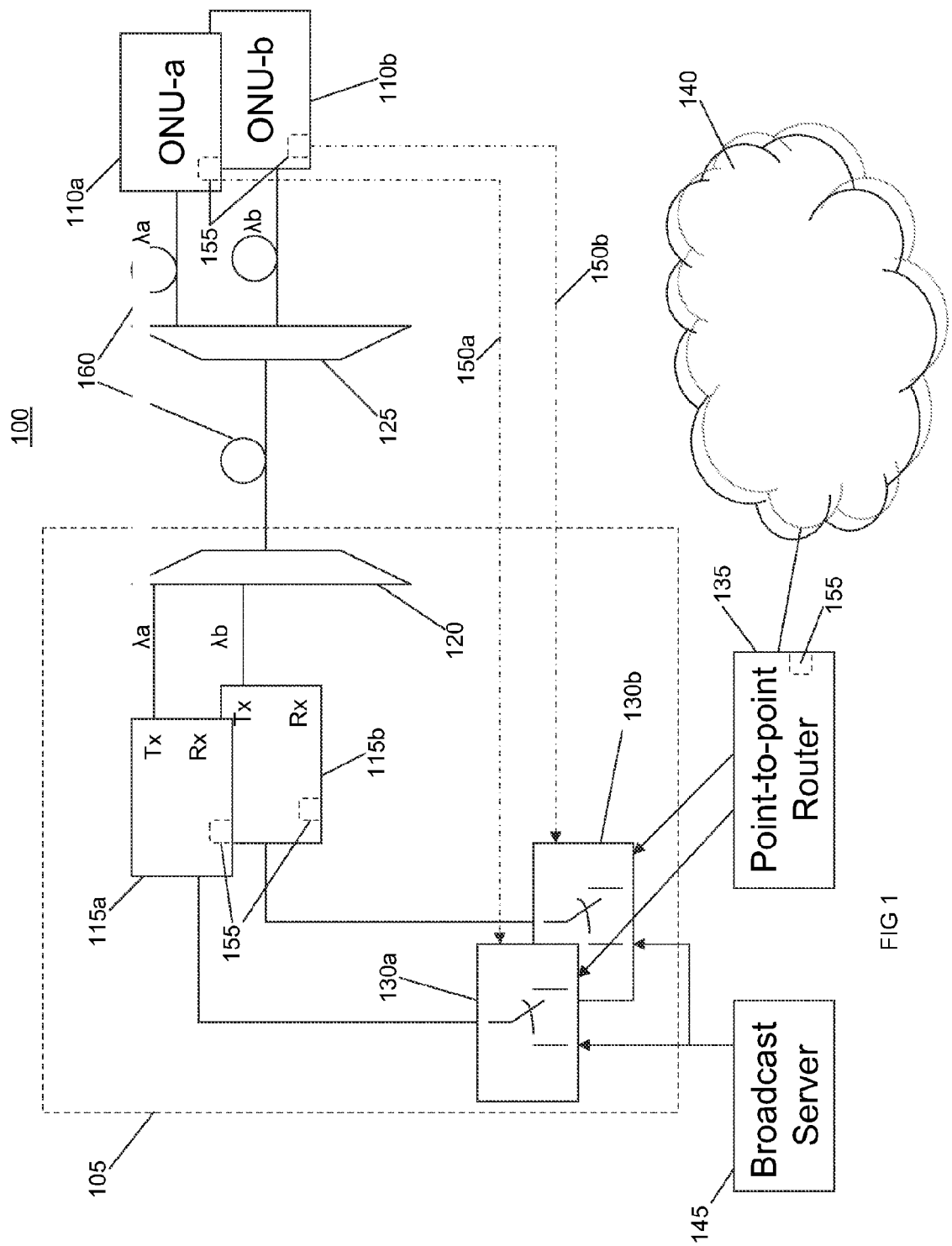
FIG. 1 is a schematic of a WDM PON according to an embodiment.

The drawings described are only schematic and are non-limiting. In the drawings, the size of some of the elements may be exaggerated and not drawn to scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware. References to nodes can encompass any kind of node, not limited to the types described, not limited to any level of integration, or size or bandwidth or bit rate and so on. References to software can encompass any type of programs in any language executable directly or indirectly on processing hardware. References to hardware, processing hardware or circuitry can encompass any kind of logic or analog circuitry, integrated to any degree, and not limited to general purpose processors, digital signal processors, ASICs, FPGAs, discrete components or logic and so on.

A wavelength division multiplexed (WDM) passive optical network (PON) according to an embodiment is shown in FIG. 1. The WDM PON 100 comprises an optical line terminal (OLT) 105 coupled to a number of optical network units (ONU) 110a, 110b using an optical fibre network 160 including a remote node 125. The OLT 105 comprises a number of WDM transceivers 115a, 115b which directly convert electrical signals carrying traffic to optical signals which are transmitted downstream to the ONU 110a, 110b. Each transceiver 115a, 115b transmits a dedicated wavelength associated with a respective ONU 110a, 110b. The transceivers 115a, 115b also receive optical signals from their respective ONU 110a, 110b, and directly convert these optical signals to electrical signals. The downstream and upstream wavelengths allocated to each ONU may be the same or different depending on system configuration. However each ONU is associated with a respective dedicated wavelength, and two dedicated wavelengths where the upstream and downstream wavelengths are different.

The process of directly converting traffic from electrical to optical signals in a PON will be well known to those skilled in the art, but briefly, incoming electrical signals carrying traffic will be inserted into frames and input to a laser device for electro-optical conversion and transmission onto the optical fibre. The frames ensure the correct optical signal format and timing to enable reception by the ONU. However there is no requirement for encapsulation of the signal into addressed packets such as Ethernet packets or time slots within the frame because each wavelength is only received and processed by one ONU. This enables electro-optical conversion or signal routing toward different equipment to be made at the physical layer (Layer 1), in order to be compatible with several technologies (eg Ethernet, SDH, OTN, GEM). Therefore direct conversion does not require complex, expensive and power consuming layer 2 or higher circuits for packet processing, or dedicated circuitry for each upper layer technology. The traffic intended for each ONU does not need to be addressed to the respective ONU or inserted into an ONU specific time slot but merely inserted into a common frame format which is directed to the respective ONU by conversion to the appropriate wavelength.

The OLT 105 also comprises a multiplexer 120 which multiplexes together the wavelengths λa, λb from the different WDM transceivers 115a, 115b. The combined optical signal is then transmitted over the fibre network 160 to a remote node comprising a demultiplexer 125. The demultiplexer 125 separates the wavelengths onto respective fibre links to respective ONU 110a, 110b as shown. Therefore each ONU 110a, 110b is associated with a respective OLT transceiver 115a, 115b using a respective dedicated wavelength λa, λb. Whilst only the downstream path from the transmission output Tx from each transceiver 115a, 115b to the respective ONU 110a, 110b is shown for simplicity, it will be appreciated that a corresponding upstream path exists from the ONU to a receiving input Rx of a respective transceiver 115a, 115b. The demultiplexer 125 in this upstream path may function as a multiplexer at the remote node and the multiplexer 120 may function as a demultiplexer, or a parallel demultiplexer (not shown) may be used for upstream wavelengths as will be appreciate by those skilled in the art.

The OLT 105 also comprises a number of input channel switches 130a, 130b coupled between the input of a respective transceiver 115a, 115b and multicast channels 145 and point-to-point channels 135. The point-to-point channels are typically provided by a router 135 coupled to the Internet 140. The router may be an IP or Ethernet router which routes incoming packets to a respective ONU depending on their user address as is known. The router 135 will comprise a number of output ports on the OLT side, each coupled to an input channel switch 130a, 130b corresponding to a respective ONU. Therefore a packet received for ONU-a for example can be forwarded to input channel switch 130a. Although not explicitly shown, packets will also be received at input ports on the OLT-side of the router 135 from the ONU 110a, 110b. These packets can then be forwarded onto the Internet 140, or to another ONU depending on their destination address.

The multicast channels will typically be provided by a broadcast server transmitting a number of TV channels. An arbitrary subset of multicast channels can be made available to all the ONUs that request them, without constraints. In certain broadcasting implementations the same set of channels can be made available to all the ONU The input channel switches 130a, 130b selectively coupled the input of their respective WDM transceiver 115a, 115b to the multi-cast channels 146 and the point-to-point channels 135. Whether the point-to-point router 135 or the broadcast server 145 is coupled to the transceiver 115a, 115b and ultimately to the corresponding ONU 110a, 110b, is controlled by a control signal 150a, 150b from the respective ONU 110a, 110b. Thus for example, in response to a control signal 150a from ONU-a 110a, input channel switch 130a switches from coupling the transceiver 115a from the point-to-point router 135 to the broadcast server 145.

The input channel switches 130a, 130b are typically layer1 electrical switches, but may alternately be optical switches where the outputs from the broadcast server 145 and the point-to-point router are optical signals. In this alternative, WDM transceivers (or transmitters only) will be used to directly convert the point-to-point and multicast channel signals into the optical domain before the input channel switch selection.

The selected multi-cast or point-to-point channels are then directly converted to the respective dedicated wavelength by the respective WDM transceivers 115a, 115b. Therefore the input channel processing at the OLT can be handled at layer 1 even with the addition of a broadcast server or other multicast input channels source. This allows the central office to retain the same low cost equipment, whilst adding channel services for the addition only of a simple layer1 switch for each wavelength of the WDM PON.

Furthermore, control of whether the ONU receives point-to-point channels or multicast channels can be simply controlled by a user. In an embodiment, the point-to-point router 135 and each ONU comprises a control signal interface 155. The interface 155 may be implemented using suitable software in an Ethernet router at each device which uses an Ethernet packet (150a, 150b) from an ONU addressed to the router 135 to control the appropriate input channel switch 130a, 130b. Alternatively a specific timeslot in the upstream wavelengths could be dedicated to the control signal 150a, 150b and which is received by the respective transceiver 115a, 115b which in turn controls the respective input channel switch 130a, 130b. Other alternative signalling mechanisms could be readily determined by the skilled person and are therefore not further described here.

In this embodiment only the downstream signal (the signal transmitted toward the user) is switched while the OLT continues to receive the upstream signal which is coupled to the point-to-point router 135. This enables this embodiment to switch back to transmitting the point-to-point channels when desired by the user as the control signal channel is still maintained.

Figure 2:
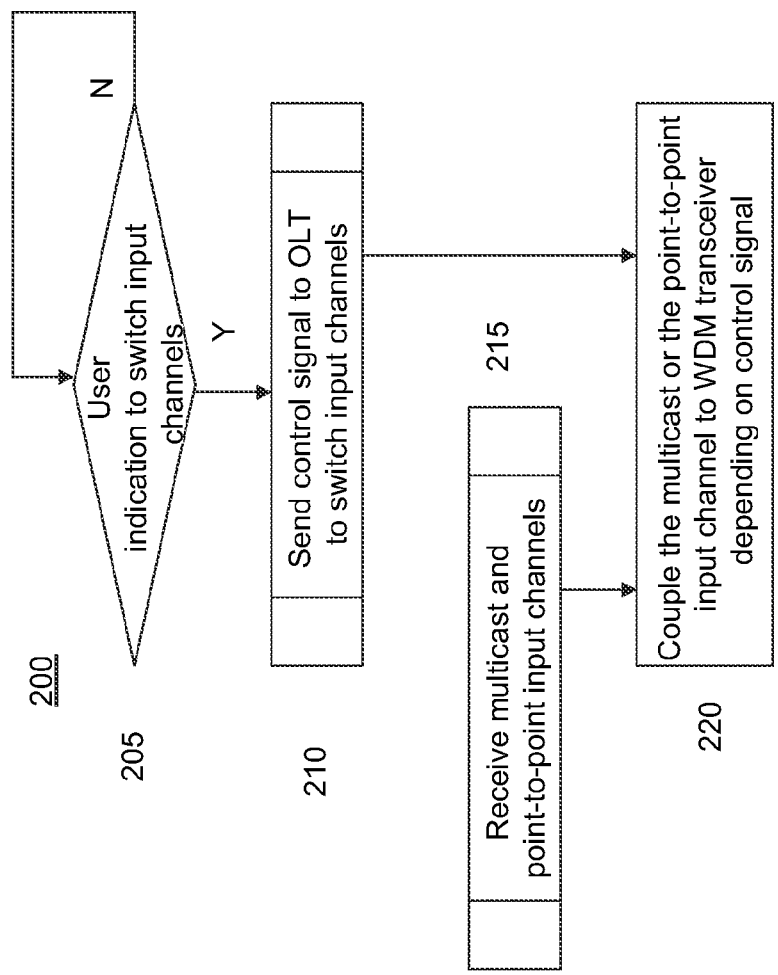
FIG. 2 is a flow chart illustrating a method of operating a WDM PON according to an embodiment.

A method of operation of the WDM PON is described in more detail with respect to FIG. 2. At the ONU 110a, 110b, the method 200 monitors for a user indication to switch channels at step 205. For example the user may which to switch from browsing the Internet to watching broadcast TV. The user indication may be provided by suitable software on a set-top box or router for example. Once such a user indication is determined, the method sends a control signal 150 to the OLT to switch input channels at step 210. The control signal may be generated by a dedicated interface in the ONU or using signalling from the set-top box or user router for example. A simple Ethernet packet may be used which is addressed to the point-to-point router in the central office and which indicates which ONU and hence input channel switch 130a, 130b to control, and which input to use point-to-point router 135 or broadcast router 145. At the OLT, the method receives multicast and point-to-point channels at step 215. Multicast or point-to-point channels are coupled to the corresponding WDM transceiver depending on the control signal at step 220.

This method enables a user at an ONU of a WDM PON to switch between two different sources of input channels at the OLT; in an embodiment multicast and point-to-point channels.

In an example application, a user is browsing the Internet, uploading photos or videos. The input channel switch 130a for that user is thus connected to the point-to-point channel equipment 135. When the user wants instead to have access to multi-cast services (e.g. an HDTV bouquet)
The user sends a request (150a) to the OLT through the upstream channel
The OLT (or PTP router 135) commutes the switch 130a using a control line The user now has access to a number of HDTV channels via the ONU 105a.

In practice, the input channel switches could be electrical switches embedded in the respective transceivers 115a, 115b and connected to multi-cast and WDM PON equipment 145, 135 via backplane. The switches could also be optical switches, connected via optical patch-cords between the transceivers 115a, 115b and the input channel equipment 135, 145.

The embodiments provide various advantages including:
1) Supporting multi-cast and broadcast in a WDM PON
2) Requiring no changes of the infrastructure (e.g. no additional fibers)
3) Cost effective (e.g. electrical switches are very cheap)
4) Saving opex and capex at the central office, since dedicated equipments, optimized on a service basis, are used in place of general purpose ones Modifications and other embodiments may come to mind to one skilled in the art having the benefit of the teachings presented in the foregoing descriptions and the associated drawings. Therefore, it is to be understood that the claims are not to be limited to the specific embodiments disclosed and that modifications and other embodiments are intended to be included within the scope of this disclosure. Although specific terms may be employed herein, they are used in a generic and descriptive sense only and not for purposes of limitation unless specifically noted.

The invention claimed is:

1. A wavelength division multiplexed (WDM) passive optical network (PON), comprising:
an optical line transmitter (OLT) comprising a WDM transceiver apparatus communicatively connected to a first optical network unit (ONU) via an optical fibre network and communicatively connected to a second ONU via the optical fibre network, wherein the WDM transceiver apparatus is operable to receive multi-cast data or point-to-point data, and wherein the WDM transceiver apparatus is arranged to transmit the multi-cast data or the point-to-point data to the first ONU using a first optical signal having a first wavelength and is further arranged to transmit the multi-cast data or the point-to-point data to said second ONU using a second optical signal having a second wavelength; and
an input channel switch apparatus connected to the WDM transceiver apparatus and arranged to i) selectively couple the first ONU to only one of a source of multi-cast data and a source of point-to-point data and ii) selectively couple the second ONU to only one of the source of multi-cast data and the source of point-to-point data,
wherein the input channel switch apparatus comprises i) a first input channel switch for selectively coupling the first ONU to the source of multi-cast data or to the source of point-to-point data and ii) a second input channel switch for selectively coupling the second ONU to the source of multi-cast data or to the source of point-to-point data, and
wherein both the first and second input channel switches are layer 1 switches.

2. The WDM PON as claimed in claim 1, wherein the first input channel switch is configured to selectively couple the first ONU to the source of multi-cast data or to the source of point-to-point data in response to a first control signal from the first ONU and ii) the second input channel switch is configured to selectively couple the second ONU to the source of multi-cast data or to the source of point-to-point data in response to a second control signal from the second ONU.

3. The WDM PON as claimed in claim 2, wherein the WDM transceiver apparatus comprises a first WDM transceiver and a second WDM transceiver,
the first WDM transceiver is configured to receive a first signal from the first input channel switch, convert the received first signal from the first input channel switch to the first optical signal having the first wavelength, and transmit the first optical signal having the first wavelength to the first ONU, and the second WDM transceiver is configured to receive a second signal from the second input channel switch, convert the received second signal from the second input channel switch to the second optical signal having the second wavelength, and transmit the second optical signal having the second wavelength to the second ONU.

4. The WDM PON as claimed in claim 3, wherein the first and second input channel switches are electrical switches arranged to receive the multi-cast and the point-to-point data.

5. The WDM PON as claimed in claim 3, wherein the first and second input channel switches are optical switches arranged to receive the multi-cast and the point-to-point data.

6. The WDM PON as claimed in claim 1, wherein the source of point-to-point data is a router and the source of multi-cast data is a multi-cast distribution server.

7. The WDM PON as claimed in claim 1, wherein the WDM transceiver apparatus and the first and the second ONUs are associated with a control signal interface for receiving and sending respective control signals.

8. The WDM PON as claimed in claim 7, wherein the respective control signals are an Ethernet frame or a dedicated slot in an upstream wavelength from the respective ONUs.

9. The WDM PON as claimed in claim 1, wherein the WDM PON is configured so that a dedicated upstream wavelength is maintained between the first ONU and the OLT.

10. The WDM PON of claim 1, wherein the input channel switch is configured to selectively couple the first ONU in response to a first control signal and to selectively couple the second ONU in response to a second control signal.

11. The WDM PON as claimed in claim 1, wherein
the WDM transceiver apparatus comprises a first WDM transceiver and a second WDM transceiver,
the first WDM transceiver is configured to receive a first signal from the first input channel switch, convert the received first signal from the first input channel switch to the first optical signal having the first wavelength, and transmit the first optical signal having the first wavelength to the first ONU, and
the second WDM transceiver is configured to receive a second signal from the second input channel switch, convert the received second signal from the second input channel switch to the second optical signal having the second wavelength, and transmit the optical signal having the second wavelength to the second ONU.

12. A method of operating a wavelength division multiplexed (WDM) passive optical network (PON) comprising an optical line transmitter (OLT) coupled to a first optical network unit (ONU) and a second optical network unit (ONU) using an optical fiber network, the OLT comprising a first WDM transceiver arranged to transmit a received input channel to the first ONU using a first wavelength and a second WDM transceiver arranged to transmit a received input channel to the first ONU using a second wavelength, the method comprising:
receiving a multi-cast channel and a point-to-point channel;
using a first layer 1 (L1) switch to switchably couple the first WDM transceiver to only one of the multi-cast channel and the point-to-point channel;
using a second L1 switch to switchably couple the second WDM transceiver to only one of the multi-cast channel and the point-to-point channel;
receiving, with the first WDM transceiver, a first signal from the first L1 switch;
converting the first received signal from the first L1 switch to a first optical signal having the first wavelength;
transmitting the first optical signal having the first wavelength to the first ONU;
receiving, with the second WDM transceiver, a second signal from the second L1 switch;
converting the second received signal from the second L1 switch to a second optical signal having the second wavelength; and
transmitting the second optical signal having the second wavelength to the second ONU.

13. The method as claimed in claim 12, wherein the coupling of the multi-cast or the point-to-point channels to respective WDM transceivers is dependent on control signals received from the respective ONU corresponding to the respective WDM transceiver.

14. An optical line transmitter (OLT) for a wavelength division multiplexed (WDM) passive optical network (PON), the OLT comprising:
a first WDM transceiver arranged to receive one of a multi-cast channel and a point-to-point channel and to transmit the multicast or point-to-point channel to a first optical network unit (ONU) using a first wavelength;
a second WDM transceiver arranged to receive one of the multi-cast channel and the point-to-point channel and to transmit the multicast or point-to-point channel to a second ONU using a second wavelength;
a first input channel layer 1 (L1) switch having a first port connected to an input of the first WDM transceiver and having a second port connected to a source of multi-cast data and a third port connected to a source of point-to-point data, wherein the first L1 switch is operable to switchably connect either its second or third port to its first port; and
a second input channel L1 switch having a first port connected to an input of the second WDM transceiver and having a second port connected to the source of multi-cast data and a third port connected to the source of point-to-point data, wherein the second L1 switch is operable to switchably connect either its second or third port to its first port, wherein
the first WDM transceiver is configured to receive a signal from the first L1 switch, convert the received signal from the first L1 switch to a first optical signal having a first wavelength, and provide the first optical signal having the first wavelength to a first ONU,
the second WDM transceiver is configured to receive a signal from the second L1 switch, convert the received signal from the second L1 switch to a second optical signal having a second wavelength, and provide the second optical signal having the second wavelength to a second ONU.

15. An OLT as claimed in claim 14, wherein the first input channel L1 switch and the second input channel L1 switch are arranged to switch between the multi-cast and the point-to-point channels in response to a control signal from the respective ONU corresponding to the respective WDM transceiver.

16. The OLT as claimed in claim 14, wherein the first WDM transceiver is configured to receive a first signal from the first input channel L1 switch associated with the first WDM transceiver, convert the received first signal from the first input channel L1 switch to a first optical signal having the first wavelength, and transmit the first optical signal having the first wavelength to the first ONU, and the second WDM transceiver is configured to receive a second signal from the second input channel L1 switch associated with the second WDM transceiver, convert the received second signal from the second input channel L1 switch to a second optical signal having the second wavelength, and transmit the second optical signal having the second wavelength to the second ONU.

17. The OLT as claimed in claim 14, further comprising a multiplexer configured to receive the first and the second wavelengths transmitted by the first and second WDM transceivers and to be coupled to an optical fiber network, wherein the first WDM transceiver is associated with the first input channel L1 switch and the second WDM transceiver is associated with the second input channel L1 switch, and each of the first and second WDM transceivers includes a control signal interface.

18. The OLT as claimed in claim 14, wherein the OLT further comprises:
   a first multiplexor having a first and second input, wherein
   the first WDM transceiver has an output connected to the first input of the first multiplexor;
   the second WDM transceiver has an output connected to the second input of the first multiplexor;
   the first WDM transceiver is configured to provide the first optical signal having the first wavelength to the first ONU by providing the first optical signal to the first multiplexor,
   the second WDM transceiver is configured to provide the second optical signal having the second wavelength to the second ONU by providing the second optical signal to the first multiplexor, and
   the first multiplexor is configured to transmit to a second multiplexor a multiplexed signal comprising the first optical signal and the second optical signal.

19. A wavelength division multiplexed (WDM) passive optical network (PON) comprising a first optical network unit (ONU), the first ONU comprising:
   an optical receiver for receiving a dedicated wavelength from an optical line transmitter (OLT), the dedicated wavelength carrying point-to-point or multicast input channels;
   a control signal interface arranged to send a control signal to the OLT in response to a user indication, the control signal requesting only one of point-to-point and multicast input channels;
   a second ONU, the second ONU comprising: a second optical receiver for receiving a dedicated wavelength from an OLT, the wavelength carrying point-to-point or multicast input channels; and a second control signal interface arranged to send a second control signal to the OLT in response to a user indication, the second control signal requesting only one of point-to-point and multicast input channels;
   an optical line transmitter (OLT) comprising a WDM transceiver apparatus communicatively connected to the first ONU via an optical fibre network and communicatively connected to the second ONU via the optical fibre network, wherein the WDM transceiver apparatus is operable to receive multi-cast data or point-to-point data, and wherein the WDM transceiver apparatus is arranged to transmit multi-cast data or point-to-point data to said first ONU using an optical signal having a first wavelength and is further arranged to transmit multi-cast data or point-to-point data to said second ONU using an optical signal having a second wavelength;
   an input channel switch apparatus connected to the WDM transceiver apparatus and arranged to i) selectively couple the first ONU to only one of a source of multi-cast data and a source of point-to-point data and ii) selectively couple the second ONU to only one of a source of multi-cast data and a source of point-to-point data;
   a first multiplexor having a first and second input;
   a first WDM transceiver having an output connected to the first input of the first multiplexor;
   a second WDM transceiver having an output connected to the second input of the first multiplexor;
   a first input channel layer 1 (L1) switch having a first port connected to an input of the first WDM transceiver and having a second port connected to a source of multicast data and a third port connected to a source of point-to-point data, wherein the first L1 switch is operable to switchably connect either its second or third port to its first port; and
   a second input channel L1 switch having a first port connected to an input of the second WDM transceiver and having a second port connected to the source of multi-cast data and a third port connected to the source of point-to-point data, wherein the second L1 switch is operable to switchably connect either its second or third port to its first port, wherein
   the first WDM transceiver is configured to receive a signal from the first L1 switch, convert the received signal from the first L1 switch to a first optical signal having a first wavelength, and provide the first optical signal having the first wavelength to the first multiplexor,
   the second WDM transceiver is configured to receive a signal from the second L1 switch, convert the received signal from the second L1 switch to a second optical signal having a second wavelength, and provide the second optical signal having the second wavelength to the first multiplexor, and
   the first multiplexor is configured to transmit to a second multiplexor a multiplexed signal comprising the first optical signal and the second optical signal.

\* \* \* \* \*